United States Patent
Banks (10) Patent No.: US 11,339,558 B1
(45) Date of Patent: May 24, 2022

(54) SINK MOUNTING APPARATUS

(71) Applicant: Taylor Banks, Hudson, WI (US)

(72) Inventor: Taylor Banks, Hudson, WI (US)

( * ) Notice: Subject to any disclaimer, the term of this patent is extended or adjusted under 35 U.S.C. 154(b) by 58 days.

(21) Appl. No.: 16/707,922

(22) Filed: Dec. 9, 2019

Related U.S. Application Data (60) Provisional application No. 62/790,285, filed on Jan. 9, 2019.

(51) Int. Cl.
| | | |
|---|---|---|
| *E03C 1/33* | (2006.01) | |
| *E03C 1/186* | (2019.01) | |
| *A47B 96/06* | (2006.01) | |
| *B29L 31/00* | (2006.01) | |
| *A47B 77/02* | (2006.01) | |
| *A47K 1/05* | (2006.01) | |
| *A47B 77/06* | (2006.01) | |

(52) U.S. Cl.
CPC ............ *E03C 1/335* (2013.01); *A47B 96/061* (2013.01); *E03C 1/186* (2013.01); *A47B 77/022* (2013.01); *A47B 77/06* (2013.01); *A47K 1/05* (2013.01); *B29L 2031/7698* (2013.01)

(58) Field of Classification Search
CPC . E03C 1/335; E03C 1/186; E03C 1/32; E03C 1/33; E03C 1/324; E03C 2201/00; A47B 96/061; A47B 77/022; A47B 77/06; A47K 1/05; B29L 2031/7698
USPC .... 248/200, 214, 172; 4/633, 643, 647, 648, 4/632
See application file for complete search history.

(56) References Cited

U.S. PATENT DOCUMENTS

| | | | | |
|---|---|---|---|---|
| 813,588 A | | 2/1906 | Rollins | |
| 832,182 A | | 2/1906 | Dimond | |
| 2,578,826 A | | 1/1950 | Mrofka | |
| 3,034,141 A | * | 5/1962 | Lyon .................. | E03C 1/33 4/634 |
| 3,128,479 A | * | 4/1964 | Juergens ............ | E03C 1/32 4/619 |
| 3,354,474 A | * | 11/1967 | Rokitenetz ........ | A47K 3/008 4/633 |
| 3,613,128 A | * | 10/1971 | Moyer ............... | E03C 1/335 4/650 |
| 3,813,707 A | * | 6/1974 | Fowell .............. | E03C 1/33 4/650 |
| 4,432,106 A | * | 2/1984 | Smith ................ | E03C 1/335 4/633 |
| 4,594,017 A | * | 6/1986 | Hills ................. | F16B 9/058 403/6 |

(Continued)

OTHER PUBLICATIONS

International Search Report and Written Opinion for International Application No. PCT/US2020/023639, dated May 29, 2020, 13 pages.

(Continued)

*Primary Examiner* — Nkeisha Smith
(74) *Attorney, Agent, or Firm* — Westman, Champlin & Koehler, P.A.

(57) ABSTRACT

A sink mounting apparatus includes a mounting bracket comprising a mounting flange configured to couple to a mounting surface and a support flange coupled to the mounting flange which extends horizontally from the mounting flange. The apparatus also includes an adjustable support extending vertically from the support flange and a contact pad disposed on a distal end of the adjustable support configured to support a fixture.

19 Claims, 8 Drawing Sheets

(56) References Cited

U.S. PATENT DOCUMENTS

| | | | |
|---|---|---|---|
| 4,613,995 A | | 9/1986 | Rieke |
| 4,665,672 A | * | 5/1987 | Commins ............. E04B 1/2608 |
| | | | 52/295 |
| 5,092,097 A | * | 3/1992 | Young ................... E04B 1/2608 |
| | | | 52/264 |
| 5,491,932 A | | 2/1996 | Elliott |
| 5,538,206 A | * | 7/1996 | Sather ....................... E03C 1/33 |
| | | | 248/201 |
| 6,439,522 B1 | * | 8/2002 | Yeh ...................... A47B 96/061 |
| | | | 248/228.6 |
| 6,986,174 B2 | | 1/2006 | Brown |
| 7,429,021 B2 | * | 9/2008 | Sather ....................... E03C 1/33 |
| | | | 248/200.1 |
| 7,698,753 B2 | * | 4/2010 | Jones ........................ E03C 1/32 |
| | | | 4/643 |
| 8,356,367 B2 | | 1/2013 | Flynn |
| 9,015,875 B2 | | 4/2015 | Pridemore |
| 9,683,357 B2 | * | 6/2017 | Provencher ............. E03C 1/335 |
| 10,087,617 B2 | * | 10/2018 | Daudet .................... E04B 2/96 |
| 2004/0049844 A1 | | 3/2004 | Stone |
| 2010/0090072 A1 | | 4/2010 | Jones et al. |

OTHER PUBLICATIONS

"Super Fast Sink Bracket" Fabricators For Fabricators LLC, dated Jun. 27, 2014, entire document retrieved online from URL: https://www.youtube.com/watchv=Z2cexu0V8tl&list=PL4RR2ZelpUT8VokgN7bxmH5PwJjrLjV_g&index=4>, 1 page.
HDL® Hardware Distributors Ltd, "Drawer Spacers", manufactured by Bainbridge, originated in U.S., Base SKU: BX3675AL (in production for at least 22 years), downloaded on Sep. 21, 2021, 6 pages.

* cited by examiner

SINK MOUNTING APPARATUS

CROSS-REFERENCE TO RELATED APPLICATION

This application claims the benefit of U.S. provisional application 62/790,285, filed on Jan. 9, 2019, the content of which is hereby incorporated by its reference.

BACKGROUND

Fixtures such as sinks and other appliances may be installed in countertops, cabinets, vanities, and the like. A variety of construction techniques may be used to mount fixtures within countertop surfaces or cabinets such as in kitchens or bathrooms. Some fixtures utilize an undermount technique to mount the fixture beneath a solid countertop with a cutout portion corresponding with the sink opening. Other designs include apron sinks, or farm sinks, which are installed within a space cut out of the countertop such that front facing side of the sink is exposed. Fixtures are available in various styles and materials and sinks may include steel and porcelain designs. Various countertop materials may also be used which can include granite, marble, quartz stone, quartzite, porcelain, glass, or composite materials. These various fixtures may use materials which are heavy or include designs with uneven surfaces, and the support systems used to mount these fixtures can be space consuming, labor intensive, or unstable.

SUMMARY

This Summary and Abstract are provided herein to introduce a selection of concepts in simplified form that are further described below in the Detailed Description. The Summary and Abstract are not intended to identify key features or essential features of the claimed subject matter, nor are they intended to be used as an aid in determining the scope of the claimed subject matter. The claimed subject matter is not limited to the implementations that solve any or all the disadvantages noted in the background.

In one embodiment, a sink mounting apparatus is provided. The apparatus includes a mounting bracket comprising a mounting flange configured to couple to a mounting surface and a support flange coupled to the mounting flange and extending horizontally from the mounting flange. The apparatus also includes an adjustable support extending vertically from the support flange and a contact pad disposed on a distal end of the adjustable support configured to support a fixture.

In another embodiment, a fixture mounting apparatus is provided. The apparatus includes a plurality of mounting brackets. Each mounting bracket includes a mounting flange configured to couple to a mounting surface and a support flange coupled to the mounting flange configured to provide a substantially horizontal support surface orthogonal to the mounting bracket. Each mounting bracket further includes a selectively adjustable support extending vertically through an aperture of the support flange and a contact pad disposed on a distal end of the adjustable support, wherein the contact pad is configured to contact and support a fixture. The fixture mounting apparatus also includes a fixture cabinet wherein the plurality of mounting brackets are spaced around an interior surface of the fixture cabinet. The apparatus further includes a fixture disposed within the fixture cabinet, wherein the fixture is supported on each of the adjustable supports of the plurality of mounting brackets.

In another embodiment, a method of mounting a fixture is provided. The method includes providing a mounting bracket with a mounting flange and support flange, the support flange extending orthogonally from the mounting flange, and further comprising an adjustable support extending vertically from the support flange with a pad disposed on one end. Next, the method includes coupling the mounting flange to a mounting surface beneath a fixture. The method further includes selectively extending the adjustable support to engage the pad with an outer surface of the fixture to support the fixture.

DETAILED DESCRIPTION

Although the present disclosure has been described with reference to preferred embodiments, workers skilled in the art will recognize that changes may be made in form and detail without departing from the scope of the disclosure. The present disclosure generally pertains to an apparatus for mounting a sink.

Some methods of sink installation use screws, bolts, or the like, to mechanically attach a mounting apparatus to a sink and countertop. However, fixtures or countertops may be manufactured from fragile materials which can be damaged by the installation method. For example, a sink or counter may crack if a fastener, such as a screw, is over tightened. Further, fixtures may comprise various designs with differently shaped or uneven outer surfaces which may be difficult to mount. A fixture mounting bracket according to embodiments of the present disclosure is configured to adjustably engage and support the outer surface of a fixture without damaging the surface of the fixture or countertop.

Figure 1:
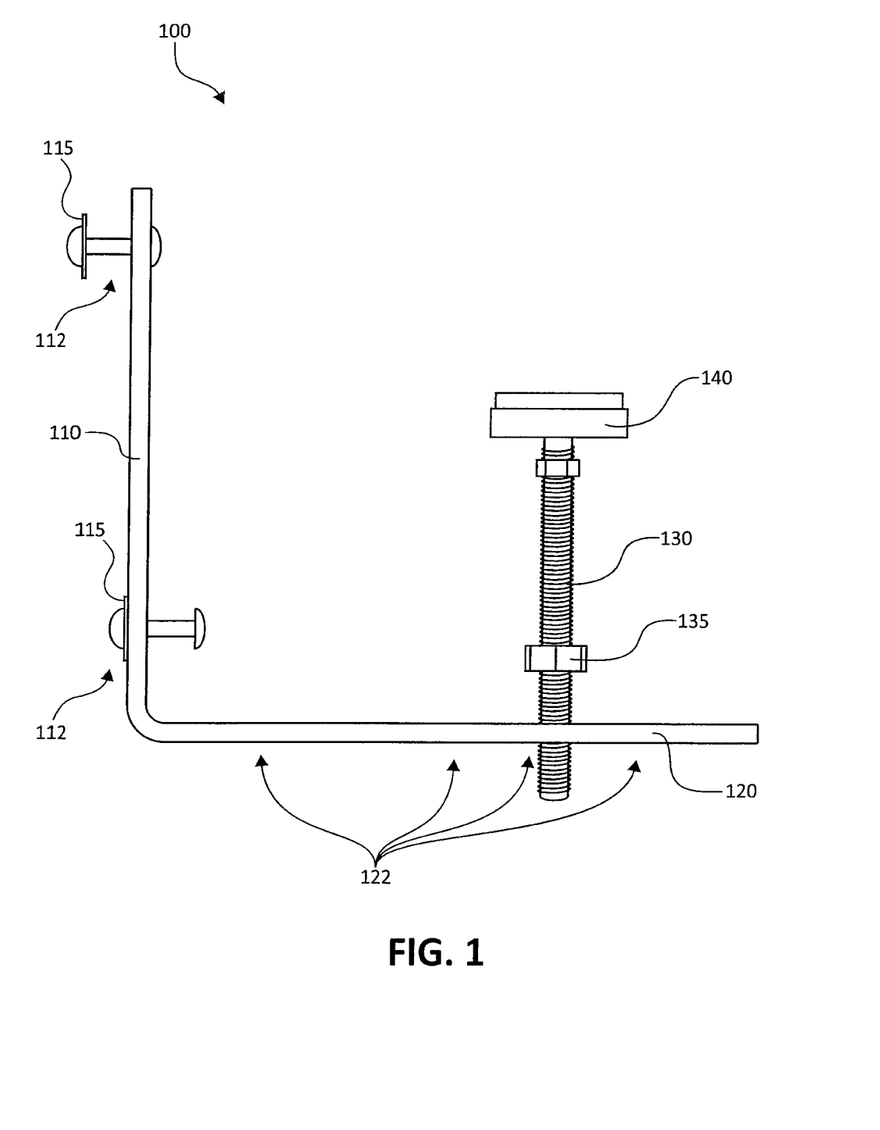
FIG. 1 illustrates a perspective side view of an embodiment of the present disclosure.

FIG. 1 illustrates a mounting bracket 100 for supporting a fixture such as a sink in accordance with the present disclosure. Bracket 100 includes a first flange or mounting flange 110 configured to couple to a mounting surface, such as a wall or interior surface of a fixture cabinet. A second flange or support flange 120 is coupled to the mounting flange 110 and disposed at a substantially right angle to the mounting flange 110. An adjustable support 130 configured to support a fixture extends vertically through support flange 120. The support flange 120 provides a horizontal surface extending from the mounting flange 110 and includes a support hole 122 or plurality of support holes spaced along support flange 120. Holes 122 provide coupling means to engage adjustable support 130 and one or more holes 122 may be included to enable adjustable support 130 to be selectively placed on support flange 120 at various distances from mounting flange 110. Adjustable support 130 is adapted to pass through the hole 122 and comprises a length sufficient to facilitate substantial height adjustment of adjustable support 130 with respect to support flange 120. A contact pad 140 is disposed at a distal end of the adjustable support 130. The contact pad 140 is configured to engage the surface of a fixture, such as the bottom outer-surface of a sink, and support the fixture without damaging the fixture.

Mounting bracket 100 may be comprised of metal, such as steel, however, a variety of materials may be used to provide sufficient strength to support a fixture.

The contact pad 140 may comprise a variety of styles, designs, and materials. Here, contact pad 140 is illustrated as substantially circular, but pads with alternative shapes or thicknesses may be used without departing from the scope of the disclosure. The contact pad may be comprised of plastic or plastic with a metal support backing. However, a variety of materials, such as metal, rubber, or polymeric composite materials, may be used to engage and support the fixture without damaging the fixture.

Adjustable support 130 is configured to adjustably couple to support flange 120 through hole 122 such as by threaded means. In one example, adjustable support 130 may comprise a threaded bolt. Hole 122 may comprise an aperture configured to engage the threads of the adjustable support 130. For example, the aperture of hole 122 may include a lip or threads configured to engage the threads of adjustable support 130 and allow selective movement of support 130. Adjustable support 130 is configured to rotate to telescopically lengthen or shorten relative to support flange 120 and can be selectively extended until contact pad 140 firmly supports the fixture.

Locking means 135 may be provided to secure adjustable support 130 within hole 122 and prevent movement of adjustable support 130 relative to support flange 120. For example, locking means 135 may comprise a threaded nut disposed on adjustable support 130 which may be selectively rotated about support 130 to contact support flange 120 and prevent movement of adjustable support within the threaded aperture of hole 122.

In one embodiment, adjustment means are included to vertically adjust the adjustable support 130. The adjustment means may comprise a shaped recess 132, such as a notch or groove, disposed on the adjustable support 130 at the end opposite the distal end coupled to the contact pad 140. Recess 132 may provide means to mechanically engage adjustable support 130, such as by a screwdriver or other means. For example, a screwdriver may engage recess 132 to rotate adjustable support 130 within the threaded aperture of hole 122. Rotation of adjustable support 130 enables the position of the contact pad 140 to be adjusted relative to the support flange 120. Rotation of adjustable support 130 thus increases or decreases the distance between the contact pad 140 and support flange 120.

The mounting flange 110 comprises a mounting hole 112 or a plurality of mounting holes 112 spaced along the length of mounting flange 110. Mounting means are provided comprising the mounting holes 112 and fasteners 115, such that holes 112 are adapted to receive the fasteners 115 therethrough and allow fasteners 115 to secure the mounting flange 110 to a surface, such as a wall or vertical cabinet surface. Fastener 115 may comprise pins, screws or any mechanical fastener or other suitable means. Alternative mounting means may also be utilized, such as an adhesive.

Figure 2:
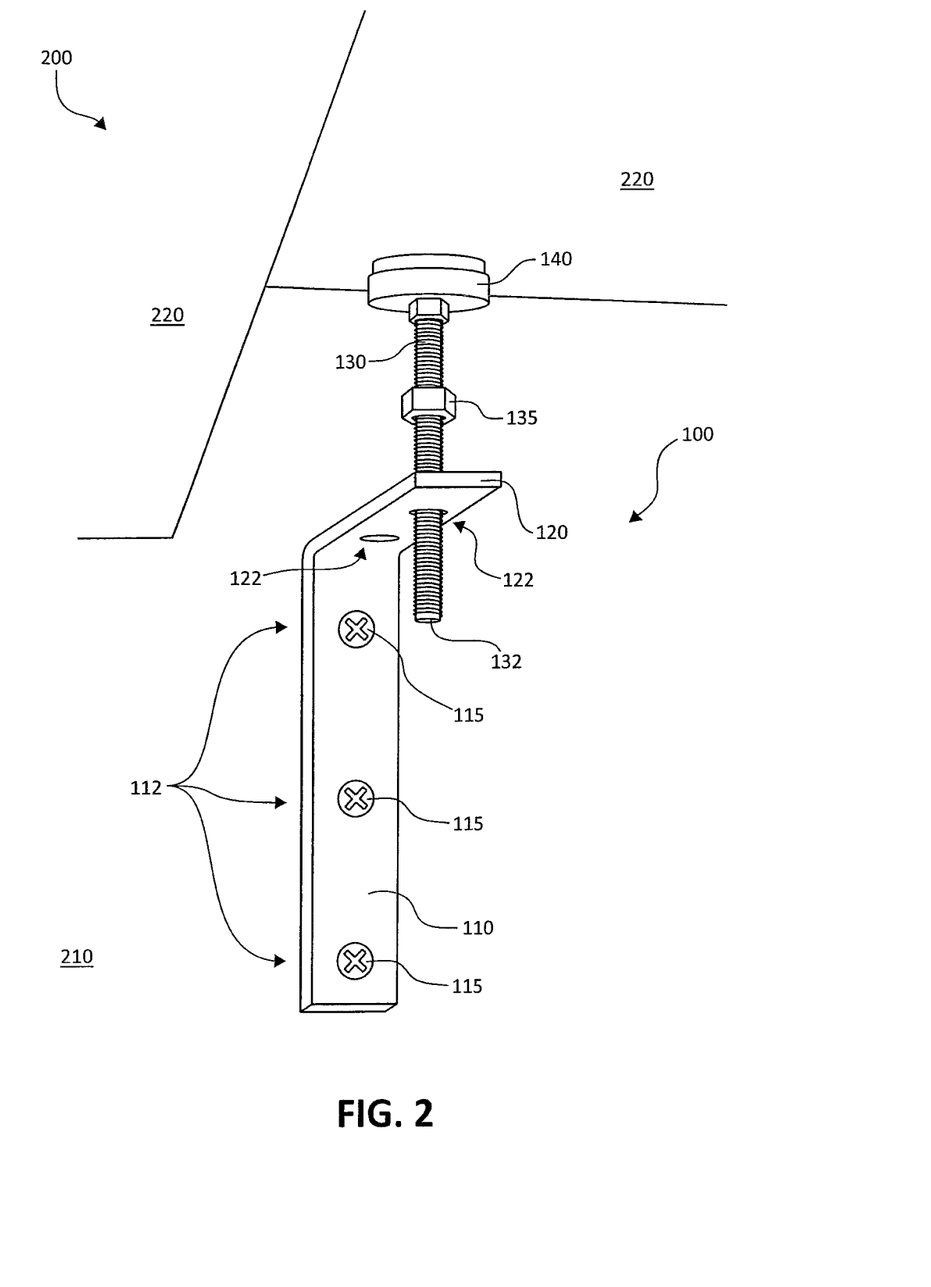
FIG. 2 illustrates a sink mounting assembly according to embodiments of the present disclosure.

FIG. 2 illustrates a sink mounting assembly 200 according to embodiments of the present disclosure. Mounting assembly 200 comprises at least one mounting bracket 100, however, a plurality of mounting brackets 100 may be used in accordance with embodiments of the disclosure. Mounting bracket 100 is within an enclosure, such as a cabinet, with a vertical surface 210, such that mounting bracket 100 is coupled to surface 210 and supports the bottom surface of a fixture 220, such as a sink. Here, mounting flange 110 of mounting bracket 100 is secured to a cabinet surface 210 by fasteners 115. Mounting flange 110 is aligned flush with cabinet surface 210 and positioned to extend vertically along surface 210. Fasteners 115 extend through mounting holes 112 to secure mounting flange 110 to surface 210.

Support flange 120 coupled to mounting flange 110 extends outwards away from surface 210 such that it is substantially horizontal. Adjustable support 130 extends vertically through a support hole 122 and includes locking means 135. The contact pad 140 disposed at the distal end of the adjustable support 130 is shown here in contact with the bottom surface of fixture 220.

Figure 3:
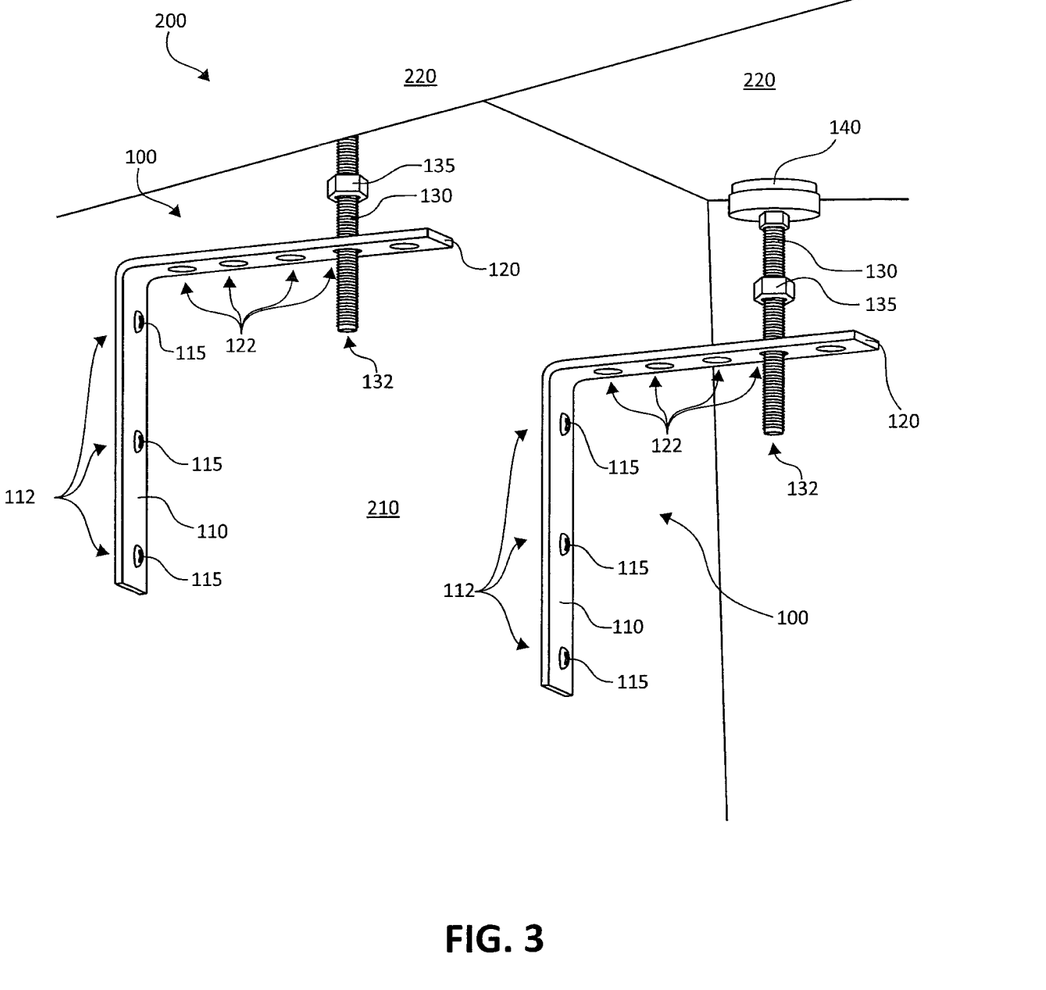
FIG. 3 illustrates the sink mounting assembly of FIG. 2 according to embodiments of the present disclosure.

FIG. 3 illustrates mounting assembly 200 in which multiple mounting brackets 100 are operatively positioned beneath fixture 220. Mounting brackets 100 are mounted on cabinet surface 210, each with an adjustable support 130 and contact pad 140 extending from support flange 120 to support fixture 220. A fixture mounting apparatus such as mounting assembly 200 includes a plurality of mounting brackets 100. Each mounting bracket 100 includes mounting flange 110 configured to couple to a mounting surface 210 and support flange 120 coupled to the mounting flange 110. Support flange 120 is configured to provide a substantially horizontal support surface orthogonal to the mounting bracket 110. A selectively adjustable support 130 extends vertically through an aperture of the support flange 120. A contact pad 140 is disposed on a distal end of the adjustable support 130 to contact and support fixture 220. The plurality of mounting brackets 100 are spaced around an interior surface 210 of a fixture cabinet and mounted to the cabinet surface. The fixture 220 is disposed within the fixture cabinet and supported by each of the adjustable supports 130 when installed.

For example, each bracket 100 may be positioned beneath the fixture 220 and each mounting flange 110 mounted to mounting surface 210 of a cabinet. Adjustable support 130 may be placed through the desired aperture of hole 122 and selectively extended. Once adjustable support 130 has been extended such that contact pad 140 is supporting the fixture 220, locking means 135 may be tightened to secure the position of the adjustable support on the support flange 120. The fixture will be mounted once each adjustable support 130 is securely engaged with the outer surface of the fixture 220.

Figure 4:
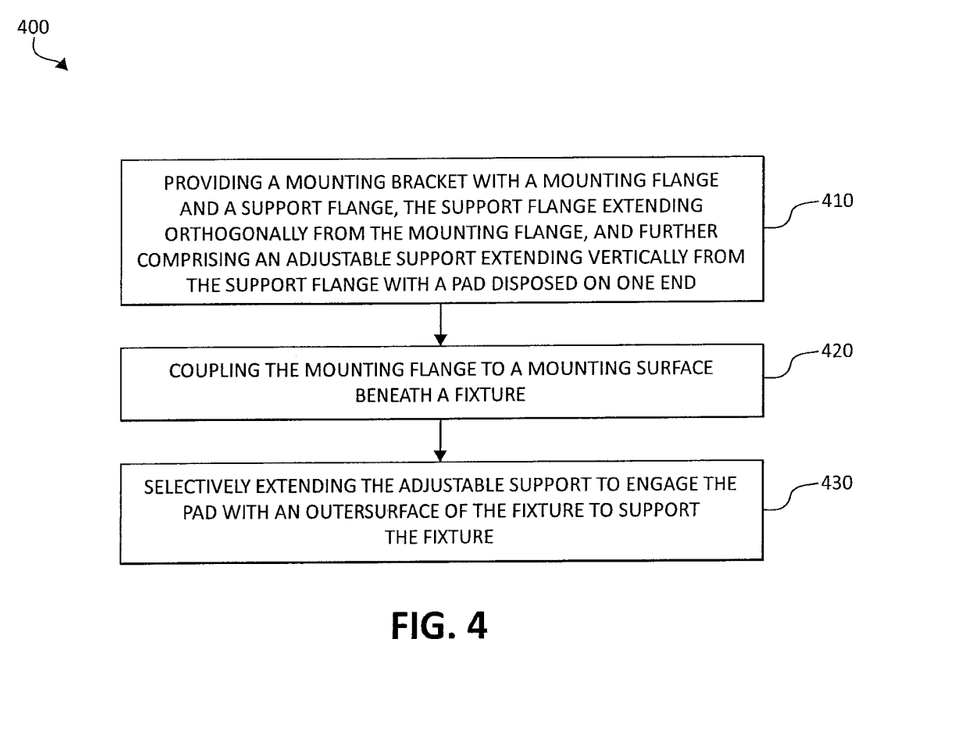
FIG. 4 is a flowchart of a method according to embodiments of the present disclosure.

Sinks and other fixtures may be mounted in a cabinet or countertop according to various methods. FIG. 4 is a flowchart of a method 400 of mounting a fixture. The method 400 includes providing 410 a mounting bracket with a mounting flange and support flange. The support flange extends orthogonally from the mounting flange and is further coupled to an adjustable support extending vertically from the support flange with a pad disposed on one end. Next, the method 400 includes coupling 420 the mounting flange to a mounting surface beneath a fixture. The method 400 further includes selectively extending 430 the adjustable support to engage the pad with an outer surface of the fixture to support the fixture.

Mounting bracket 100 is described above as comprising mounting flange 110 and a support flange 120 formed in a substantially "L" shaped bracket. However, a sink mounting assembly may use a mounting bracket comprising a variety of shapes and sizes without departing from the scope of the disclosure. For example, the mounting bracket may comprise a triangle bracket, or use similar features, such that a third flange (see, e.g., flange 605 of FIG. 6) couples diagonally between the mounting flange and the support flange. The third flange provides greater mechanical strength to the support flange when supporting a fixture. Other embodiments may include variations in the support flange, such as additional bends, additional flanges or supporting features coupling the mounting flange or the support flange, or alternative configurations of the mounting flange.

Figure 5:
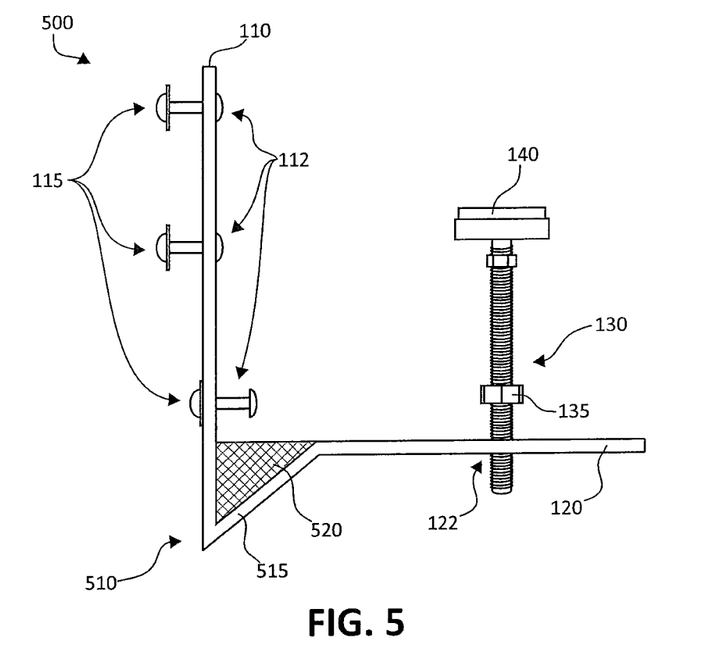
FIG. 5 illustrates a mounting bracket according to another embodiment of the present disclosure.

FIG. 5 illustrates a mounting bracket 500 with a bridge flange 515 according to another embodiment of the present disclosure. Similar to FIGS. 1-3, mounting bracket 500 includes a mounting flange 110 and support flange 120. FIG. 5 further includes a brace 510 feature which couples the flanges. In one embodiment, brace 510 comprises bridge flange 515 coupling the mounting flange 110 to the support flange 120, such that bridge flange 515 extends from the mounting flange 110 in a plane that is other than orthogonal. For example, the bridge flange 515 may extend upwards at an angle to form a space between the surface of mounting flange 110 and the bridge flange 515. The support flange 120 extends from the bridge flange 510 in a plane generally horizontal to the mounting flange 110 and provides an aperture configured to engage adjustable support 130.

In one embodiment, brace 510 may further comprise additional bracing material 520 in the space between the surface of mounting flange 110 and the bridge flange 515. Bracing material 520 may provide additional mechanical support to the support flange when supporting a fixture. For example, bracing material 520 may include properties that resist tensile forces between the support flange and mounting flange caused when downward pressure is placed on the support flange (e.g., when the mounting bracket is supporting a fixture on the support flange). Bracing material 520 may comprise any suitable material, such as plastic, metal, or a composite material, which may provide additional strength to the mounting bracket.

Although bridge flange 515 is illustrated as extending at an upward angle from mounting flange 110, various configurations may be used without departing from the scope of the disclosure. Here, bridge flange 515 extends upwards at a substantially 45 degree angle from flange 110, however, different angles may be used. The brace 510 may also include additional bends or bracing materials to be adapted to different mounting conditions. For example, bridge flange 515 may be adapted to enable the mounting bracket to be mounted within confined spaces or to accommodate cabinets or fixtures of different sizes or designs.

It should be noted a bracket (e.g., bracket 100, 500) may be placed in a flipped or upside down configuration according to embodiments of the present disclosure. For example, bracket 500 is illustrated in an alternate configuration compared to FIGS. 2-3. In FIGS. 2-3, mounting bracket 100 is configured with support flange 120 extending from the top of mounting flange 110, such that adjustable support 130 extends above the flanges. In contrast, FIG. 5 shows a configuration similar to FIG. 1 wherein support flange 120 extends horizontally from the bottom of mounting flange 110 such that mounting flange 110 extends vertically upwards above support flange 120 alongside mounting flange 110.

Figure 6:
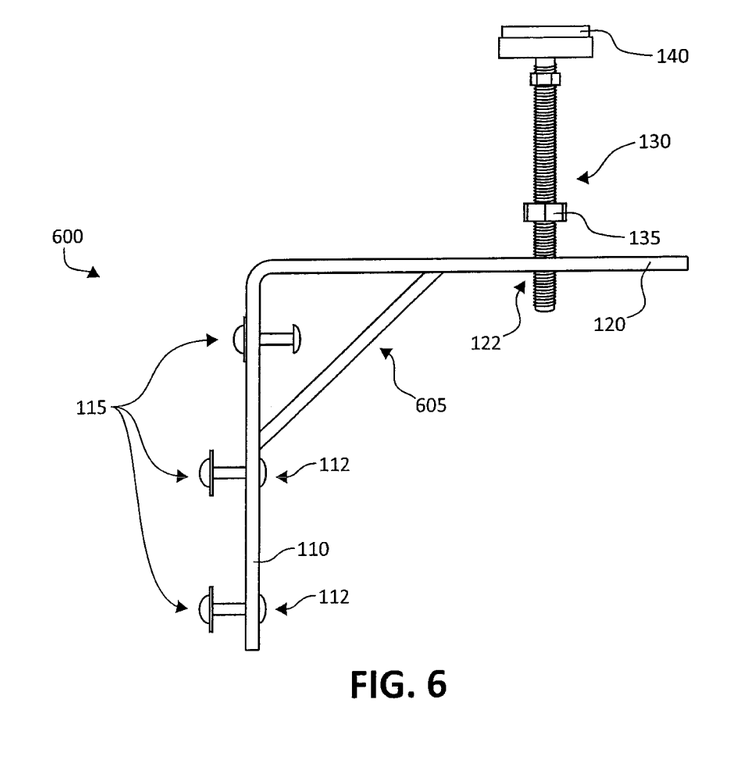
FIG. 6 illustrates a sink mounting assembly according to embodiments of the present disclosure.

FIG. 6 illustrates a side view of mounting bracket 600 which includes a third flange or brace flange 605. Similar to mounting bracket 100 and 500, bracket 600 includes mounting flange 110 and support flange 120 coupled at a substantially right angle. Flange 605 couples diagonally between the mounting flange 110 and the support flange 120 to form a brace therebetween. The third flange 605 provides greater mechanical strength to the support flange 120 when supporting a fixture. As can be seen, mounting bracket 600 is configured similar to FIGS. 2-3 such that mounting flange 110 extends beneath support flange 120. In an alternative embodiment, mounting flange 110 may extend above support flange 120 and a third flange may couple the flanges.

In the above mounting brackets (e.g., mounting bracket 100, 500, 600) the support flange 120 extends from an upper or lower end of the mounting flange 110 to form a substantially "L" shape, however, alternative embodiments may be used. For example, support flange 120 may extend from mounting flange 110 from a point between the upper and lower end in a substantially "T" shape. In other embodiments, support flange 120 may extend from mounting flange 110 at a different position or at an angle other than horizontal. Alternative configurations are possible and flange configurations may be adapted to accommodate various mounting conditions according to embodiments of the present disclosure.

Figure 7:
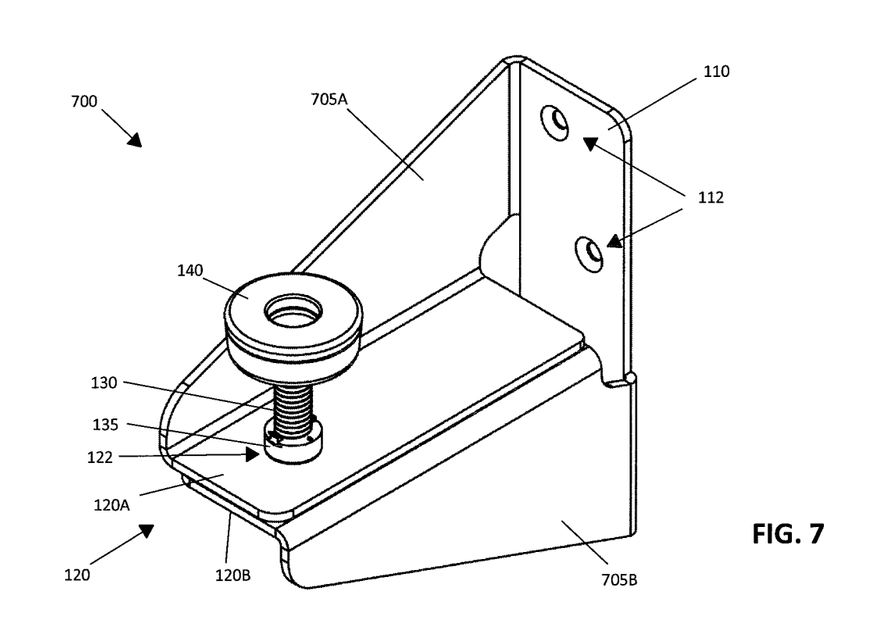
FIGS. 7-9 illustrate a perspective view of a sink mounting assembly according to another embodiment of the present disclosure.
Figure 8:
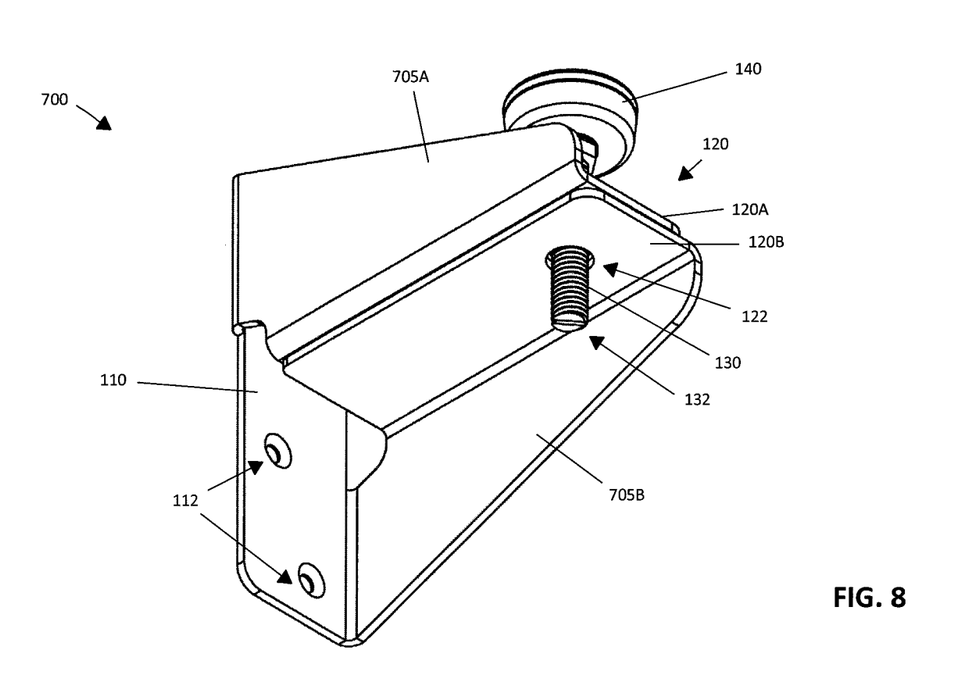
Figure 9:
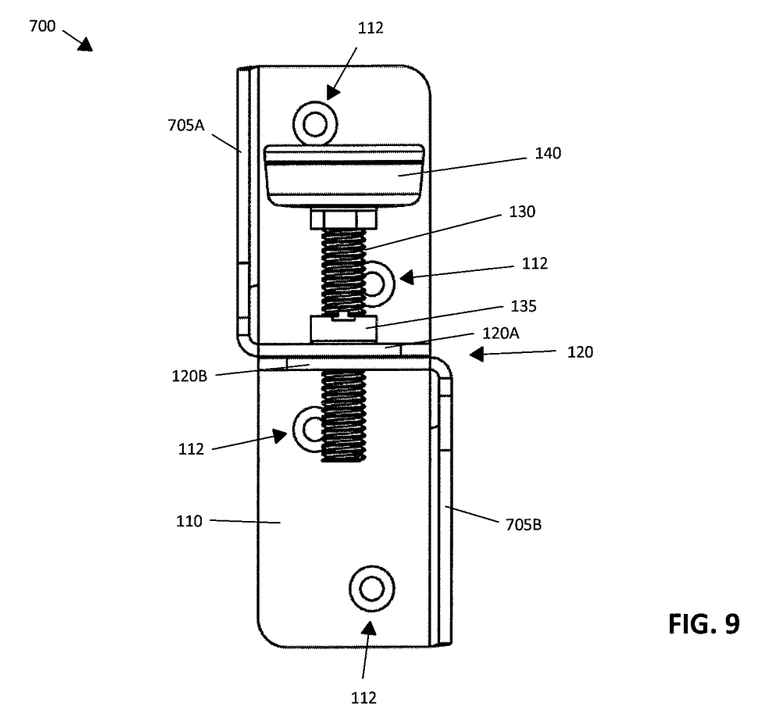

FIGS. 7-9 illustrate views of mounting bracket 700 with planar support flanges 705A,B. FIG. 7 illustrates a top side view of mounting bracket 700. FIG. 8 illustrates a bottom side view of mounting bracket 700. FIG. 9 illustrates a front view of mounting bracket 700. Similar to FIGS. 1-3, mounting bracket 700 includes a mounting flange 110, a support flange 120 that is substantially perpendicular to mounting flange 110, and an adjustable support 130 configured to adjustably couple to support flange 120. Here, the support flange 120 is formed by upper support flange 120A and lower support flange 120B such that support flange 120 is substantially perpendicular to mounting flange 110 at a point between the upper and lower end of mounting flange 110.

Planar support flanges 705A,B extend from a vertical side of mounting flange 110 such that upper planar support flange 705A extends from one side of the upper end of mounting flange 110, and lower planar support flange 705B extends from one side of the lower end of mounting flange 110.

In one example, each planar support 705A,B extends outwards substantially orthogonal from mounting flange 110 and includes a bend to form a part of support flange 120. As shown, upper planar support 705A bends to form upper support flange 120A and lower planar support 705B bends to form lower support flange 120B. Each support flange 120A,B includes an aperture which aligns to form support hole 122 and provides coupling means to engage adjustable support 130. Locking means 135 may be provided to secure adjustable support 130 within hole 122 and prevent movement of adjustable support 130 relative to support flange 120. Although one hole 122 is shown, one or more holes 122 may be included in support flange 120 without departing from the scope of the disclosure.

The embodiment shown may be cut from a sheet as a single piece and bent to form the structure of mounting bracket 700. For example, each planar support 705A,B and support flange 120A,B respectively may be formed as a unitary piece with mounting flange 110 and folded to form the structure of mounting flange 110 and support flange 120. However, a sink mounting assembly may be formed using separate pieces, and a variety of methods may be used without departing from the scope of the disclosure.

Figure 10:
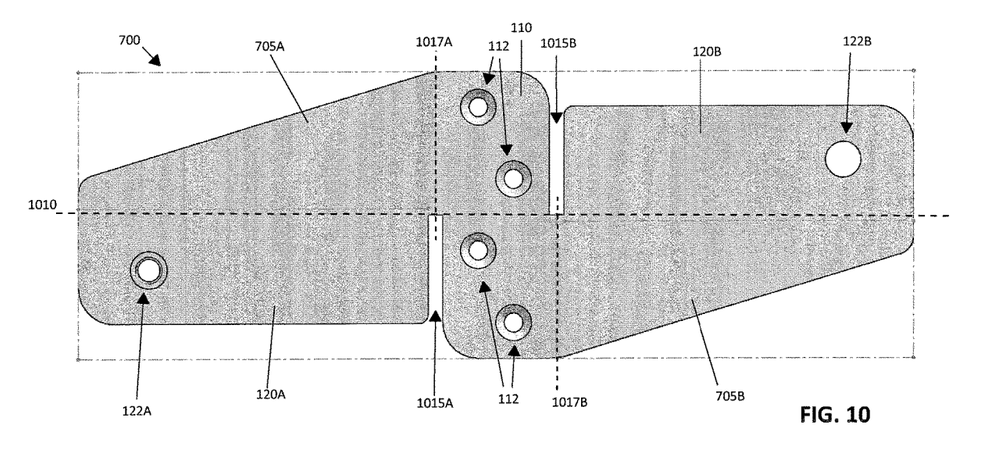
FIG. 10 illustrates a flat sheet lying on a vertical plane which may be folded to form the structure of the sink mounting assembly of FIGS. 7-9.

FIG. 10 illustrates mounting bracket 700 as a flat sheet lying on a vertical plane which may be folded to form the structure of mounting bracket 700. A horizontal axis shown by line 1010, passes through the middle of the vertical plane and forms a horizontal plane. Slits 1015A and 1015B may be formed parallel to one another on opposing sides of the horizontal axis 1010, such that slit 1015A lies below axis 1010 and slit 1015B lies above axis 1010. Slits 1015A,B are formed on vertical axis on either side of mounting flange 110, shown here as dotted lines 1017A,B respectively. In one example, the back end of slits 1015A,B are inside the horizontal plane 1010. In another example, the slits 1015A,B may be different lengths, such that the back ends of slits 1015A,B extend past horizontal axis 1010, or end before passing horizontal axis 1010. Mounting holes 112 may be spaced along the length of mounting flange 110 such that the mounting holes 112 above the horizontal axis 1010 may be placed asymmetrical to the mounting holes 112 below horizontal axis 1010.

Each support flange 120A,B includes hole 122A,B respectively. As can be seen, holes 122A,B are not aligned when bracket 700 is in a flat, unfolded configuration, but holes 122A,B become aligned when bracket 700 is in a folded configuration, as shown in FIGS. 7-9. To align holes 122A,B, each support flange 120A,B is folded about the horizontal axis 1010 to align with the horizontal plane of axis 1010. Each planar support 705A,B may be folded about the vertical axis on lines 1017A,B and bent towards mounting flange 110. In one embodiment, support flange 120A is aligned above support flange 120B. Once holes 122A,B are aligned, they provide a passage through the top surface of flange 120A to the bottom surface of flange 120B which is configured to provide coupling means to engage the adjustable support 130, such as by forming a threaded aperture.

In one embodiment, support hole 122A is smaller than support hole 122B. In a second embodiment, hole 122A is of equal size to hole 122B. In another embodiment, hole 122A may include a raised element surrounding hole 122A, where in one example, the raised element has a smaller diameter than the diameter of hole 122A, and in another example the raised element has a diameter equal to hole 122A.

In a further embodiment, holes 112 may include a countersink feature formed of a tapered hole with a wider outer portion on the surface of the mounting flange 110 such that a fastener 115 may sit flush with or below the surface of mounting flange 110.

The embodiment of FIG. 10 using a folding design produces a support flange 120 with a double layer formed by the upper and lower flanges 120A,B. This feature allows bracket 700 to support a greater weight than other sink mounts. The planar support flanges 705A,B further provide greater load-bearing support to the support flange 120 when supporting a fixture. As can be seen, upper support flange 705A supports upper flange 120A from an end near mounting flange 110 to the end near support hole 122A, allowing bracket 700 to greater resist downward forces placed on adjustable support 130 when supporting a fixture. Further, lower support flange 705B supports lower flange 120B from an end near mounting flange 110 to the end near support hole 122B, and provides upward support to adjustable support 130 against the downward force of a fixture. Thus, the structure of planar supports 705A,B and support flanges 120A,B provide upper and lower load-bearing structures to transmit fixture loads from the adjustable support 130, at the end of the horizontal support flange 120A,B, to the vertical length of mounting flange 110.

The embodiments described herein provide many benefits over other fixture support means. Apron sinks, for example, may have irregular and uneven bottom surfaces, and these surfaces make evenly supporting the weight of the fixture difficult and time consuming. Sink brackets that utilize horizontal supports that pass underneath the entirety of a fixture, for example, may inadequately support the uneven bottom surface of the fixture, such that the fixture may tilt out of alignment without additional fixture supports.

The embodiments described herein allow multiple brackets to be independently placed to support a fixture, and the adjustable support height of each bracket may be selectively increased or decreased to be adapted to the uneven bottom surface of the fixture. Thus, each bracket may be adjusted independently to level the fixture being supported. Further, the area in which a fixture is placed may have a variety of layouts and features which can impede fixture installation, and the disclosed embodiments provide the flexibility to be used with a variety of installation locations. For example, sink cabinetry may include different elements, such as a dishwasher, sink disposal or various piping which are taken into account when installing a fixture, and the brackets embodied herein allow an installer to individually place the brackets based on the fixture's installation location.

Although the embodiments have been described in relation to forming support for an apron sinks, this is exemplary only, and fixtures, such as sinks, bathtubs, counters, or shelving may also benefit from the sink mounting apparatus described herein. These embodiments may provide support for various fixtures without departing from the scope of the disclosure.

The illustrations of the embodiments described herein are intended to provide a general understanding of the method of the various embodiments. The illustrations are not intended to serve as a complete description of all of the elements and features of methods and systems described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed is:

1. A sink mounting apparatus, comprising:
a mounting bracket comprising a one-piece sheet of metal of uniform thickness having:
a mounting flange configured to couple to a mounting surface;
a bi-layered support flange, comprising non-separable support flange layers, indirectly coupled to the mounting flange and positioned in a horizontal plane perpendicular to the mounting flange;
an adjustable support extending vertically from the bi-layered support flange; and
a contact pad disposed on a distal end of the adjustable support configured to support a fixture.

2. The sink mounting apparatus of claim 1, wherein the mounting flange comprises a plurality of holes configured to engage fasteners adapted to couple to the mounting surface.

3. The sink mounting apparatus of claim 2, wherein the fasteners comprise screws, bolts, or pins.

4. The sink mounting apparatus of claim 1, wherein the bi-layered support flange comprises at least one hole configured to support the adjustable support.

5. The sink mounting apparatus of claim 4, wherein the at least one hole of the bi-layered support flange comprise an aperture configured to threadably engage the adjustable support.

6. The sink mounting apparatus of claim 1, wherein the adjustable support comprises a shaped recess configured to vertically adjust the support.

7. The sink mounting apparatus of claim 1, wherein the adjustable support comprises a threaded bolt.

8. The sink mounting apparatus of claim 1, and comprising locking means to prevent movement of the adjustable support.

9. A method comprising:
providing a mounting bracket formed of a one-piece sheet of metal of uniform thickness, the mounting bracket comprising:
a mounting flange configured to couple to a mounting surface;
a bi-layered horizontal support flange portion indirectly coupled to the mounting flange via vertical support flange portions, wherein the bi-layered horizontal support flange portion is positioned in a horizontal plane perpendicular to the mounting flange;
providing an adjustable support extending vertically from the bi-layered horizontal support flange portion; and
providing a contact pad disposed on a distal end of the adjustable support configured to support a fixture.

10. The method of claim 9 and further comprising providing a plurality of holes in the mounting flange, the plurality of holes configured to engage fasteners adapted to couple to the mounting surface.

11. The method of claim 9, providing at least one hole in the bi-layered horizontal support flange, the at least one hole configured to support the adjustable support.

12. An apparatus, comprising:
a mounting bracket comprising:
a mounting flange configured to couple to a mounting surface; and
a bi-layered horizontal support flange portion, comprising non-separable support flange layers, indirectly coupled to the mounting flange via vertical support flange portions, wherein the bi-layered horizontal support flange portion is positioned in a horizontal plane perpendicular to the mounting flange with a space between the bi-layered horizontal support flange and the mounting flange, and wherein the vertical support flange portions are perpendicular to both the mounting flange and the bi-layered horizontal support flange portion, and wherein a first vertical support flange portion of the vertical support flange portions is above the bi-layered horizontal support flange portion, and a second vertical support flange portion of the vertical support flange portions is below the bi-layered horizontal support flange portion.

13. The apparatus of claim 12, wherein the mounting flange comprises a plurality of holes configured to engage fasteners adapted to couple to the mounting surface.

14. The apparatus of claim 13, wherein the fasteners comprise screws, bolts, or pins.

15. The apparatus of claim 12, further comprising:
an adjustable support extending vertically from the bi-layered support flange portion; and
a contact pad disposed on a distal end of the adjustable support configured to support a fixture,
wherein the bi-layered horizontal support flange portion comprises at least one hole configured to support the adjustable support.

16. The apparatus of claim 15, wherein the at least one hole of the bi-layered horizontal support flange portion comprises an aperture configured to threadably engage the adjustable support.

17. The apparatus of claim 15, wherein the adjustable support comprises a shaped recess configured to vertically adjust the support.

18. The apparatus of claim 15, wherein the adjustable support comprises a threaded bolt.

19. The apparatus of claim 15, and comprising locking means to prevent movement of the adjustable support.

* * * * *